3,780,171
INGESTIBLE POLYMERIC COMPOSITIONS

Klaus Irmscher, Michael Klockow, Werner Mehrhof, Klaus Pfitzner, Dieter Randaj, Herbert Nowak, and Karl-Otto Freisberg, Darmstadt, Germany, assignors to Merck Patent Gesellschaft mit beschrankter Haftung, Darmstadt, Germany
No Drawing. Filed Dec. 15, 1970, Ser. No. 98,441
Claims priority, application Germany, Dec. 27, 1969, P 19 65 133.3; Oct. 10, 1970, P 20 49 938.1
Int. Cl. A61k 27/00
U.S. Cl. 424—79     4 Claims

ABSTRACT OF THE DISCLOSURE

Ingestion of effective amounts of a polymeric composition comprising at least one synthetic, non-toxic, water insoluble granular cross-linked polymer which is inert to digestive enzymes and contains ionizable amino groups, and has a macroporous structure, a swelling volume of less than 5 ml./g. in water and a maximum grain size of 0.5 mm. and which exhibits, after equilibration with air of 100% relative humidity at 25° C., a moisture content of less than 50% by weight, produces a lowering of cholesterol and triglyceride blood levels. The polymeric compositions exhibit lipid-binding and bile-acid binding effects and lipase inhibition.

BACKGROUND OF THE INVENTION

This invention relates to novel polymeric compositions which comprise nitrogen-containing polymers and which possess inter alia, bile-acid-binding and triglyceride-binding activity, and to their production and use.

It is known (see, for example, British Pat. 929,391) to employ polymers in orally administrable pharmaceutical preparations for binding bile acids in the intestinal tract and for lowering the cholesterol blood levels. Such a preparation is, for example, cholestyramine, which is a strongly basic anion exchanger in chloride form and is commercially available as an agent for the treatment of pruritus in conjunction with gallbladder obstruction.

It was found that certain synthetic non-toxic polymers containing ionizable amino groups bind bile acids to a greater extent than cholestyramine, as evidenced by in vitro tests. Moreover, they also exhibit a triglyceride-binding effect not observed with cholestyramine.

SUMMARY OF THE INVENTION

The polymeric compositions of this invention comprise at least one synthetic, non-toxic, cross-linked polymer which is inert to digestive enzymes, contains ionizable amino groups, has a macroporous structure, a swelling volume of less than 5 ml./g. in water, and which exhibits, after equilibration with air having 100% relative humidity at 25° C., a moisture content of less than 50% by weight, in unit dosage form, preferably in combination with at least one solid, liquid or semi-liquid, physiologically acceptable adjuvant or carrier.

This invention also relates to processes for the production of the polymeric compositions of this invention and to the use thereof for obtaining bile-acid-binding, triglyceride-binding, lipase-inhibiting, cholesterol-level-lowering and/or triglyceride-level-lowering effects in living beings.

DETAILED DISCUSSION

The synthetic non-toxic polymers present in the pharmaceutical preparations of this invention, called "effective agents" hereinafter, in contrast to cholestyramine possess a macroporous structure and a swelling volume of less than 5 ml./g. in water. After equilibration with air having 100% relative humidity at 25° C., they exhibit a moisture content of less than 50%. In this aspect, they differ from the effective agents of British Pat. 929,391 which, under the same conditions, show a moisture content higher than 65%.

In addition to bile-acid and triglyceride-binding activity, the effective agents also possess anti-lipase activity with respect to bound triglycerides and lower at least one of the cholesterol and triglyceride blood-levels, usually in a balanced fashion, as evidenced by in vitro testing. The effective agents are especially valuable as lipase inhibitors when incorporated into dietary compositions for humans or animals, by means of which excess weight can be controlled. The preparations of this invention can thus be employed as agents against obesity and against other diseases in human beings and other mammals, e.g., domestic animals and pets, associated with too high a fat absorption in the body, e.g., above normal average cholesterol and/or triglyceride blood levels.

The simultaneous presence of bile-acid-binding, triglyceride-binding, and lipase-inhibiting effects is a unique advantage of the effective agents of this invention.

Preferred effective agents are amine substituted polystyrene polymers having the above-described properties, especially those represented schematically by the following formula:

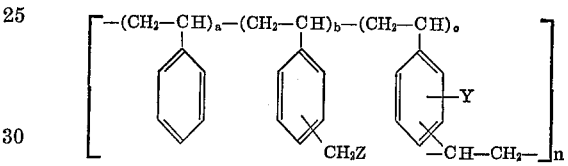

wherein Y is H or $CH_2Z$, Z being an ionizable amino group, i.e., Y is an aminomethyl, alkylaminomethyl, e.g., methylaminomethyl, dialkylaminomethyl, e.g., dimethylaminomethyl, or quaternary aminomethyl, e.g., tetramethylammoninummethyl group. An ionizable amino group is an amino group which forms a substituted ammonium salt with an acid and a quaternary ammonium salt with a quaternizing agent.

The effective agents can be primary, secondary or tertiary amines, in free base form, in the form of ammonium hydroxides, or in the form of acid addition salts or quaternary ammonium salts. The indices $a$, $b$, and $c$ indicate the proportion of the corresponding monomers in the structure of the effective agent, their total being about 100%. The value for $a$ is normally between about 1 to 20%, for $b$ between about 60 to 94% and for $c$ between about 5 to 20%.

The index $c$ represents the cross-linking agent (e.g., divinylbenzene) content. It is surprising that polymers of this chemical type with such a high content of cross-linking agent exhibit the above-described effects, since the assertion is made in British Pat. 929,391 that cross-linking above about 5% seriously impairs the effectiveness of the resins.

The index $n$ is a measure of the degree of polymerization. Because of three-dimensional cross-linking, a precise numerical value cannot be given for $n$. However, $n$ is larger than about 1,000.

The Z group can be a primary, secondary, or tertiary amino group of the formula $R_2N-$ or a quaternary ammonium group of the formula $R_3N^\oplus X^\ominus$, wherein the R groups can be identical or different and preferably represent H, alkyl or hydroxyalkyl, preferably containing 1–5 carbon atoms, e.g., methyl, ethyl and 2-hydroxyethyl. Especially preferred effective agents are those wherein two of the R groups represent, respectively, a methyl group and the third R group, when present, is a hydrogen atom or a methyl group. The associated anion $X^\ominus$ represents $OH^\ominus$ or an anion of any desired physiologically acceptable acid. Normally, the effective agents are administered in the form of chlorides. However, it is also possible, for example, to employ the corresponding sulfates, phosphates, e.g., primary (dihydrogen) phosphates, secondary (monohydrogen) phosphates, or tertiary phosphates, bicarbonates, carbonates, formates, acetates, propionates, malonates, succinates, malates, tartrates, citrates, maleates, fumarates, ascorbates, or polymers charged with the anions of saccharin or of amino acids, e.g., aspartic acid or glutamic acid.

Of the effective agents which are in quaternary ammonium form, the quaternary ammonium chlorides are especially suitable. However, if these are administered in very high dosages, hyperchloremic acidosis can occur, wherein the concentration of the chloride ions rises in the serum, the concentration of the bicarbonate ions in the serum is reduced, chloride ions are excreted in the urine to an increased extent, and the pH of the urine is reduced. These undesired side-effects can be reduced to a minimum by employing, if effective agents are administered in very high dosages, quaternary chlorides in a mixture with other quaternary salts, e.g., together with bicarbonates, phosphates, or citrates.

The effective agents are produced by conventional polymerization, employing a relatively high content of crosslinking agent (5–20% by weight, preferably 6–8% by weight) and in the presence of inert substances which affect the macroporous structure of the polymers. The functional groups can be introduced subsequently by chloromethylation, followed by amination.

Among the basic anion exchanges commercially available, those suitable for use as the effective agents or conversion thereto are those which have a macroporous structure. For example, the products available under the trade names set forth below can be employed:

Amberlite IRA–68, Amberlite IRA–93, Amberlite IRA–401, Amberlite IRA–401–S, Amberlite IRA–900, Amberlite IRA–904, Amberlite IRA–910, Amberlite IRA–911, Amberlite XE–238, Amberlyst A–21, Amberlyst A–26, Amberlyst A–27, Amberlyst A–29, Deacidite FFIP, Deacidite HIP, Deacidite KMP, Deacidite MIP, Deacidite NIP, Deacidite PIP, Duolite A 101 D, Duolite A 101 D Hi, Duolite A 102 D, Lewatite MP 60, Lewatite MP 62, Lewatite MP 64, Lewatite MP 500, Lewatite MP 600.

The Amberlites and Amberlysts are manufactured by Rohm and Haas Company, Philadelphia, Pa.; the Deacidites by The Permutit Co., London, England; the Duolites by Diamond Alkali Co., Western Division, Redwood City, Calif., the Lewatites by Fabrenfabriken Bayer AG., Leverkusen, Germany.

These commercial resins are not usually employed in this invention in the form wherein they are sold in commerce. Rather, they are used in the washed, optionally dried and optionally ground condition, so that many of their characterizing data, for example, water content, piled weight, grain size, absorption capacity, differ from those given by the manufacturer for resins as sold.

Two commercial preparations proved to be particularly advantageous, which will be designated below as "effective agent A" and "effective agent B" and the properties (characteristic data) of which are compiled in the following table in comparison to the properties of cholestyramine:

| | Cholestyramine | Effective agent A | Effective agent B |
|---|---|---|---|
| Type of amine | Quaternary | Tertiary | Quaternary |
| Content of crosslinking agent (divinylbenzene) | 2% | >5% | >5% |
| Capacity (dry) | 2.9 meq./g. | 4.2 meq./g. | 3.6 meq./g. |
| Swelling volume in water | 21 ml./g. | 3.6 ml./g. | 3.25 ml./g. |
| Piled weight (dry) | 440 g./l. | 280 g./l. | 275 g./l. |
| Water absorption at 25° C. | >65%[1] | 28% | 36%. |

[1] According to British Pat. 929,391.

NOTE.—Effective Agent A: "Lewatit MP 62"; Effective Agent B: "Lewatit MP 500", manufacturer: Farbenfabriken Bayer AG, Leverkusen, Germany.

The characterizing data given in the table above were determined as follows:

Capacity (a) Polymers of the quaternary amine type: One gram of the dry polymer is converted into the OH-form with 5% aqueous NaOH until no chloride can be detected in the filtrate. The reaction product is then washed neutral with water. In a column, the OH anion of the resin is exchanged against Cl anion with 40 ml. of 10% NaCl solution, and the product is washed with 100 ml. of water. The base content of the filtrate is titrated with 0.1 N HCl. One ml. of consumed HCl corresponds to a resin capacity of 0.1 milliequivalent (meq.) per gram.

(b) Polymers of the tertiary amine type: One gram of the dry polymer is stirred for 30 minutes with 50 ml. of 1 N NaOH, washed free of alkali with water and then mixed with 10 ml. of 1 N HCl in a measuring flask. The contents of the flask is brought to 100 ml. with water and the mixture is allowed to stand for 16 hours with occasional shaking. The residual unabsorbed acid is titrated with 0.1 N NaOH against methyl red indicator.

Swelling volume

One gram of the dry polymer is allowed to stand with occasional shaking for 2 hours, in a sufficient amount of water (10–30 ml.) to provide a suspension of the polymer therein. Then, in a measuring cylinder, after one minute of vibrating, the volume of the polymer submerged under water is determined.

Water absorption

Four grams of the polymer, dried at 60° C. under reduced pressure until a constant weight is attained, is maintained in a water-saturated atmosphere on a watch glass in a desiccator at 25° C. until no further weight increase occurs. The water absorption is indicated in percent of total weight.

Compared to cholestyramine, in vitro, effective agent A has twice the lipid-binding effect, and effective agent B has a 30% higher lipid-binding effect. (The term "lipids" designates the substances which are bound from a mixture of triglycerides and ox bile by the polymers, in accordance with the experimental methodology described below.) The bile-acid-binding effect of effective agent A in vitro is approximately the same as that of cholestyramine. The bile-acid-binding effect of effective agent B is about 50–60% greater than that of cholestyramine.

The following cholesterol-level- and triglyceride-level lowering effects were obtained in an in vivo test on lipid-fed rats. (For methodology, see Leffler, American Journal of Clinical Pathology, 31, 310 (1959), and Eggstein and Kreutz, "Klinische Wochenschrift" [Clinic Weekly], 44, 262–267 [1966]):

| | Cholesterol lowering effect in percent | Triglyceride lowering effect in percent |
|---|---|---|
| Cholestyramine | 19 | 6 |
| Effective agent A | 22 | 21 |

The effective agents of this invention also lower the phospholipid content of the liver. For example, compared to untreated controls, effective agent A lowered by 70% the total lipid content and lowered by 83% the phospholipid content of rat liver tissue (determined after incineration as phosphorus, in accordance with Quinland and Desega, Analytical Chemistry 27, 1626 [1955]).

In contrast thereto, under otherwise identical experimental conditions, cholestyramine lowered by 18% the total lipid content and lowered by only 1% the phospholipid content.

It was also found that the effective agents favorably influence the lipid content of the liver. After homogenization of deep-frozen liver specimens and extraction with chloroform/methanol (methodology, see Sperry, Methods of Biochemical Analysis, 2, 83 [1955]), the total cholesterol and triglyceride contents were determined according to the above methods. With effective agent A, cholesterol content was lowered by 21% and triglyceride content was lowered by 36%.

Thus, the substances described herein exhibit two biological points of impact. They intervene in the enterohepatic cycle of the bile acid and inhibit the re-resorption thereof. This has the secondary effect of reducing the cholesterol level, as in the case of cholestyramine. However, in contrast to cholestyramine, the effective agents can also directly bind triglycerides and prevent their resorption, on the same order of magnitude as cholesterol, in the in vivo model. This results in a reduction of the triglyceride level of the blood and has great importance with respect to fat metabolism in the liver.

The effectiveness of the effective agents is dependent on the grain size thereof, i.e., the smaller the grain size, the larger the lipid-binding power. In contrast thereto, the bile-acid-binding power is less dependent on the grain size. Therefore, the ratio of lipid-binding effect to bile-acid-binding effect can be regulated to a desired value by the use of an effective agent of a specific grain size. In vivo, this means that the ratio of cholesterol lowering activity to triglyceride lowering activity can be varied or adjusted within limits.

The grain size of the effective agents normally is no greater than 0.5 mm., e.g., about 0.0001 to 0.5 mm., preferably between 0.001 and 0.2 mm. Effective agents containing grain sizes larger than 0.5 mm., are substantially less effective than the same effective agents of smaller grain size.

The influence of grain size can be seen from the table below, which gives the activities of effective agent A of various degrees of fineness.

| Grain size (mm.) | 0.2–0.36 | 0.125–0.2 | 0.024–0.125 |
| --- | --- | --- | --- |
| Lipid-binding effect (g. of lipids per g. of effective agent) | 0.35 | 1.22 | 2.12 |
| Bile-acid-binding effect (g. of bile acid per g. of effective agent) | 0.33 | 0.55 | 0.56 |
| Lipase inhibition (percent) | 15 | 61 | 63 |

It can be seen from these data that if a lipid binding effect of 30 g./day is desired, a maximum particle size larger than 0.2 mm. would require ingestion of substantially larger amounts of the effective agent than if maximum particle size is 0.2 mm.

The values in the above table were determined as follows:

Lipid-binding effect

Two grams of a triglyceride mixture (olive oil) is emulsified in 80 ml. of water with the addition of 1 g. of ox bile (fel bovis) under vigorous agitation. One gram of effective agent is then left in the emulsion for 30 minutes under slight agitation at pH 6. The mixture is filtered, washed with water, and dried at 60° C. under reduced pressure to a constant weight. The increase in weight corresponds to the total amount of the lipids bound by the effective agent.

Bile-acid-binding effect

The above-described experimental procedure is followed, but in the absence of the triglycerides. The weight increase is considered a measure of the amount of bile acids bound by the effective agent.

Lipase inhibition 100 mg. of olive oil is emulsified in 20 ml. of a 0.1-molar borate buffer, pH 8.5, additionally containing 0.3% of albumin, 0.2% sodium desoxycholate and 0.2% of $CaCl_2$. 100 mg. of effective agent as defined hereinabove, is added thereto followed by 0.1 mg. of pig pancreas lipase. The mixture is maintained at 30° C. under constant agitation. After 1, 2, and 4 hours, respectively, a 5 ml. aliquot is titrated to a pH of 11.0. In parallel therewith, a control experiment is conducted in the absence of an effective agent. Percentage of inhibition is calculated by means of the equation $$LI = 100 \times \frac{V_{control} - V_{inhibition}}{V_{control}}$$

($LI$ = percentage of inhibition; $V_{control}$ = consumed NaOH [ml.] in control experiment; $V_{inhibition}$ = consumed NaOH [ml.] in inhibition experiment).

The lipase inhibition is also dependent on the ratio of concentration of effective agent to triglyceride. When larger amounts of effective agent are employed, higher inhibition values can be attained. Thus, in accordance with the above-indicated methodology, inhibitions of 48%, 93% and 94% were attained with 50, 200 and 400 mg., respectively (instead of 100 mg.) of effective agent A (grain size 0.125–0.2 mm.).

The effective agents can be employed in a mixture with solid, liquid and/or semi-liquid excipients as drugs in the human or veterinary medicine. Suitable vehicles are organic or inorganic substances amenable to enternal application and which do not react with the effective agents, such as, for example, water, benzoyl alcohol, polyethylene glycols, gelatin, lactose, amylose, magnesium stearate, talc. Suitable for enternal application are tablets, dragees, pastilles, capsules, but more advantageously, granules, powders and suspensions. The above-mentioned preparations can optionally be sterilized or mixed with adjuvants, e.g., lubricants, preservatives, stabilizers, or wetting agents, emulsifiers, salts for influencing the osmotic pressure, buffers, coloring, flavoring and/or aromatous substances and sweetners, e.g., saccharin.

The effective agents can also be administered, if desired, in combination with one or more additional components of a low-fat diet or reducing diet, e.g., anorectic agents, and can be administered together with or in the form of a comestible substance, e.g., jellies, preserves, candies, syrups and juices, nutrient substances, e.g., proteins, carbohydrates, vitamins, e.g., vitamin A, $B_1$ $B_2$, $B_6$, $B_{12}$, C, $D_2$, $D_3$, E and minerals commonly administered in conjunction therewith.

The polymeric compositions are preferably ingested in dosages of 0.2–10 g. per dosage unit. The daily dosage advantageously ranges from about one to 30 g., preferably about 5 to 30 g. However, due to the low toxicities of the effective agents, it is also possible to apply substantially higher dosages, e.g., 50, 100, and even up to about 200 g. per day. The polymeric compositions are preferably ingested daily over a prolonged period of time, e.g., at least a week or more e.g., 2–12 weeks or longer. With patients having above average cholesterol and/or triglyceride blood levels, daily ingestion can continue over a period of months or even years.

The exact amount which is administered depends upon the relative activity of the selected polymer and the effected desired. If the polymeric composition is administered to treat obesity, the amount which should be ingested should be sufficient to bind most or all of the daily ingested lipids so that a negative lipid balance is reached. If the composition is administered to lower cholesterol and/or triglyceride blood levels, the amount which should be ingested should be sufficient to reduce significantly one or both such levels.

The effective agents of this invention for the most part are odorless and tasteless and thus are similar to cholestyramine in this respect. Due to the very low swelling power of these agents, they can, however, be more readily processed into pharmaceutical formulations and thus are markedly superior to cholestyramine. Thus, the application of the effective agents of this invention requires only a minor additional supply of liquid, whereas, when ingesting strongly swelling effective agents, for example cholestyramine, considerable amounts of fluids must be supplied to the body. This presents difficulties because all of these substances must be taken in relatively high dosages.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE A

Processing of a commercial product

The starting material is a commercially available macroporous basic anionic exchange resin in spherical grain form based on polystyrene (Lewatit MP 62 of Farbenfabriken Bayer, previously ground).

The starting resin has the following characteristic data:

Grain size: 0.3–1.0 mm.
Piled weight of the swollen resin: 600–680 g./l.
Specific charge: up to 40 l./h.l.
Total capacity (swollen resin): 1.8 meq./ml.
Usable capacity: up to 38 g. (CaO/l. of resin) (under special conditions up to 45 g.)
Temperature stability: up to 100° C.

In a mechanical wet screening procedure, the resin particles of <0.5 mm. are screened from the commercial product. 100 g. of the smaller particles are washed in a column with 300 ml. of methanol and thereafter quantitatively converted into the chloride form with 2 N HCl. The reaction product is washed free of acid with twice-distilled water, dried for 48 hours under reduced pressure at 60° C., and the thus-obtained product is comminuted for 12 hours or longer in a mortar ("Retsch" mill). In a dry mechanical analysis, the resulting "effective agent A" is segregated into fractions of a grain size of 0.024–0.125 mm., 0.125–0.2 mm., and 0.2–0.36 mm., respectively.

In the examples set forth below, pharmaceutical preparations according to this invention are described.

EXAMPLE 1

Preserves

The dosage unit is composed as follows:

| | G. |
|---|---|
| Effective agent | 5 |
| Fruit paste (dried) | 3 |
| Pectin | 0.5 |
| Citric acid | 0.5 |
| Ascorbic acid | 0.1 |
| Preservative (e.g., sorbic acid) | 0.1 |
| Cane sugar | 10 |
| Water | 10.8 |

EXAMPLE 2

Capsules 0.5 g. of effective agent is mixed with 5 mg. of magnesium stearate. The mixture is filled into capsules coated with soft gelatin.

EXAMPLE 3

Dragees

Each dragee core contains:

| | G. |
|---|---|
| Effective agent | 0.2 |
| Lactose | 0.1 |
| Wheat starch | 0.25 |
| Talc | 0.048 |
| Calcium stearate | 0.002 |

The coating consists of a mixture of wheat starch, sugar, talc, finely divided silicic acid, and tragacanth.

EXAMPLE 4

Tablets 500 g. of effective agent and 100 g. of potato starch are mixed, wetted with a solution of 2 ml. of glycerin in 100 ml. of 90% ethanol, granulated with 200 ml. of aqueous 50% gelatin gel, and, after admixing with 50 g. of talc and 1 g. of magnesium stearate, compressed into 750 mg. tablets.

Each tablet contains 500 mg. of effective agent.

EXAMPLE 5

Syrup

A mixture is prepared from the following components:

| | Kg. |
|---|---|
| Effective agent | 20 |
| Polyoxyethylene sorbitan fatty acid esters | 2 |
| Cane sugar | 35 |
| Carboxymethylcellulose | 0.5 |
| Preservative (e.g., a mixture of methyl p-hydroxybenzoate and n-propyl p-hydroxybenzoate) | 0.1 |
| Ascorbic acid | 0.5 |
| Glycerin | 2 |
| Flavoring and coloring agents | As required |

This mixture is brought to 100 liters by the addition of distilled water. One dosage unit (5 ml.) contains 1 g. of effective agent.

EXAMPLE 6

Aqueous suspension 30 kg. of glycerin is mixed with 1 kg. of agar-agar and the mixture is added to 40 l. of water, stirred until the mixture is homogeneous and then heated to 50° C. Thereafter, 20 kg. of effective agent and 150 g. of sodium saccharin, as well as coloring and flavoring agents are required are added to the cooled mixture, and the volume is brought to 100 liters by the addition of water.

One dosage unit (5 ml.) contains 1 g. of effective agent.

EXAMPLE 7

Powder

A mixture is prepared of the following ingredients:

| | Kg. |
|---|---|
| Effective agent | 70 |
| Sodium alginate | 4 |
| Gum arabic | 26 |

The mixture is finely pulverized and the thus-obtained powder is sealed airtight into 5 g. unit packages. Shortly prior to use, one or more packages are opened, the content suspended by agitation in a liquid or semi-liquid carrier, e.g., in water, fruit juices, vegetable juices, alcohol-free beverages, such as milk, applesauce, and administered in this form.

EXAMPLE 8

Granules 3 g. of flavoring agents are dissolved in 100 ml. of ethanol; the solution is mixed with 797 g. of glucose, and the thus-obtained aromatized glucose is added to a mixture of 10 kg. of effective agent, 300 g. of sodium alginate, and 400 g. of polyacrylic acid. The components are mixed thoroughly, granulated, dried in air, and filled and sealed airtight into polyethylene bags, each containing 4 g. of the granules.

EXAMPLE 9

Powder 5 kg. of effective agent are extremely finely pulverized and sealed airtight into 5 g. unit packages. Shortly before use, one or several packages are opened and the contents are suspended by stirring into a liquid or semi-liquid vehicle, e.g., in water, fruit or vegetable juice or other alcohol-free beverage, e.g., milk, or applesauce, and administered in this form.

EXAMPLE 10

Aqueous suspension

One kg. of effective agent, 100 g. of pectin, and 10 g. of sorbic acid are stirred with sufficient pure water to provide 10 liters of suspension. One dosage unit (5 ml.) contains 0.5 g. of effective agent.

The effective agents must be administered in relatively large quantities if it is desired to achieve a triglyceride-binding effect. Assuming an average fat absorption of 60 g. per day and a fat-binding power of the effective agents of twice their weight, it would be necessary, for example, to administer 30 g. of effective agent per day in order to bind the entire amount of fat absorbed. For such large amounts of effective agent, the conventional pharmaceutical preparations are less suitable. Therefore, it is advantageous to administer the effective agents together with foods, for example in the form of hors d'oeuvres or desserts, such as cocktails, juice drinks, cakes, and other dessert foods.

EXAMPLE 11

Fruit juice drink 150 l. of fruit juice, e.g., orange, tomato or currant juice, is mixed with 1 kg. of sodium alginate, 30 kg. of effective agent, and 0.1 kg. of sorbic acid. One dosage unit (180 ml.) contains about 30 g. of effective agent.

EXAMPLE 12

Pastry 50 g. of margarine and 2 eggs (95 g.) are stirred into 175 g. of sugar. Gradually, the following components are incorporated intno this mixture: 250 g. of oatmeal, 50 g. of flour, 300 g. of effective agent, 8 g. of commercial baking powder, aromatous substances according to choice, and such an amount of water (375 g.) that kneadable dough is produced. After baking, 895 g. of pastry is obtained having a content of effective agent of 33.5%. Thus, one cookie of a weight of 15 g. contains approximately 5 g. of effective agent.

EXAMPLE 13

Pastry

The procedure of Example 12 is followed, but omitting the margarine and using 200 g. of sugar, thus obtaining 860 g. of a practically fat-free pastry having an effective agent content of 34.8%. A daily ingestion of 6 cookies of respectively about 15 g. (prior to, during, or after meals) corresponds to the administration of 30 g. of effective agent.

It is also possible to produce similar pastry wherein the proportion of sugar is replaced by sorbitol or physiologically acceptable artificial sweetners, e.g., sodium saccharin.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for lowering at least one of elevated blood cholesterol and blood triglyceride levels which comprises orally administering to a mammal having said condition, an effective amount from 1–30 grams/day of a non-toxic, water-insoluble granular cross-linked styrene polymer of the formula

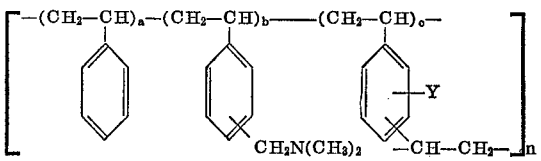

wherein Y is H or —$CH_2N(CH_3)_2$, $n$ is an integer greater than about 1,000 and $a$, $b$ and $c$ are the proportions of the respective monomeric units, $a$ being about 1 to 20%, $b$ being about 60 to 94%, $c$ being about 6 to 8% and their sum being 100%, which polymer is inert to digestive enzymes, has a macroporous structure, a swelling volume of less than 5 ml./g. in water and a maximum grain size of 0.5 mm. and which exhibits, after equilibration with air of 100% relative humidity at 25° C., a moisture content of about 28% by weight.

2. A process according to claim 1 wherein the amount administered is 5–30 grams daily.

3. A process according to claim 2 wherein the composition is administered in admixture with a physiologically acceptable carrier.

4. A process according to claim 3 wherein the composition is administered as an admixture with a comestible.

References Cited

UNITED STATES PATENTS 3,383,281   5/1968   Wolf et al. _____ 424—78

OTHER REFERENCES

Amber Hi Lites, Rohm & Haas Co., September 1963, No. 77.

Amber Hi Lites, Rohm & Haas Co., November 1963, No. 78.

Amber Hi Lites, Rohm & Haas Co., November 1965, No. 90.

ALBERT T. MEYERS, Primary Examiner

N. A. DREZIN, Assistant Examiner

U.S. Cl. X.R.

424—78

UNITED STATES PATENT OFFICE
CERTIFICATE OF CORRECTION

Patent No. 3,780,171          Dated December 18, 1973

Inventor(s) Klaus Irmscher, et al.

It is certified that error appears in the above-identified patent and that said Letters Patent are hereby corrected as shown below:

IN THE HEADING:   Inventor "Dieter Randaj" should read

-- Dieter Randau --.

Signed and sealed this 16th day of April 1974.

(SEAL)
Attest:

EDWARD M.FLETCHER,JR.            C. MARSHALL DANN
Attesting Officer                Commissioner of Patents